Patented Aug. 19, 1952

2,607,702

UNITED STATES PATENT OFFICE 2,607,702

GLASS COLOR COMPOSITION AND THE VEHICLE THEREFOR

Christian C. Jessen, Perth Amboy, N. J., assignor to E. I. du Pont de Nemours and Company, Wilmington, Del., a corporation of Delaware No Drawing. Application November 13, 1951, Serial No. 256,161

2 Claims. (Cl. 106—172)

This invention relates to vehicles for glass colors and, more particularly, it relates to such vehicles which are solid at room temperature but melt readily at a temperature slightly above room temperature.

This application is a continuation-in-part of my copending application Serial No. 79,301, filed March 2, 1949.

Glass colors, composed of inorganic pigments and finely ground glass, have long been used in the decoration of ceramic (glass, china, porcelain, etc.) and metal objects. For many years, glass colors were mixed with suitable solvents, viscosifying and dispersing agents to form a plastic mass which was applied, in the desired design, to a ceramic or metal object by squeegeeing the same through a screen stencil. The stencilled design was then solidified by removal of the solvent and fired to fuse the glass color to the object.

This formerly-known process was operated with a great deal of success; however, it was necessarily slow by reason of the time required to remove the solvents from the applied color design. This was particularly annoying when it was desired to apply multi-color designs by superimposing, in registry, several different colors in succession on an object.

It has, more recently, been suggested to prepare glass color squeegee compositions by mixing the glass colors with a vehicle that is solid at room temperature but will readily melt at a temperature slightly above room temperature. It was contemplated that such compositions would be applied in their molten state and allowed to solidify by cooling to below their melting point.

It is an object of this invention to produce a vehicle for glass colors which will solidify rapidly at room temperature.

It is another object of this invention to produce a vehicle for glass colors which will melt at a temperature of about 47° C. to 100° C., and which will solidify rapidly at room temperature.

It is still another object of this invention to produce a glass color squeegee composition which may be applied in successive superimposed layers by means of a squeegee stencil with great rapidity.

Other objects of the invention will appear hereinafter.

The above objects may be accomplished in accordance with the present invention by employing a glass color vehicle comprising 30% to 60% of stearic acid, 2% to 7% of stearyl acid phosphate, 0.1% to 10% of ethyl cellulose, 15% to 40% of hydrogenated rosin, and 10% to 30% of "poly-pale" resin, a resin prepared by polymerizing the unsaturated resin acids contained in rosin, e. g., pimaric and abietic acids. A full description of "poly-pale" resins is found in the second edition—July 1942—Bulletin issued by the Naval Stores Department of the Hercules Powder Company of Wilmington, Delaware. The use of 0.01% to 1.5% phosphorated tall oil as a moisture-resistant agent, in addition to the above ingredients, may be desirable but not essential.

A glass color comprising 5% to 20% inorganic oxide pigment and correspondingly 95% to 80% finely-ground glass frit may be mixed in a proportion of glass color to vehicle of 1:1 to 6:1 with the above-said vehicle to produce a glass color squeegee composition which may be applied at a temperature of between 47° C. and 100° C. to a ceramic or metal object through a screen stencil. The glass color squeegee composition will solidify almost immediately after withdrawal of the screen stencil. By the use of the composition of this invention it is possible to superimpose a number of different glass colors in quick succession on an object to produce intricate multi-color designs.

The ethyl cellulose is present as a viscosity promoting substance to improve the application properties and to function as a hardening agent for the vehicle. The ethyl cellulose must be present in such amount as to constitute 0.1% to 10% of the vehicle composition. The ethyl cellulose may have an ethoxyl content of 45% to 55% and a viscosity of 5 to 500 centiposes.

The hydrogenated rosin, "poly-pale" resin, and stearic acid comprise the solvent system of the present vehicle composition. These materials function as the binder to adhere the enamel to ware prior to fusion of the enamel in the commercial furnace.

Stearyl acid phosphate imparts a setting property to the vehicle and reduces the entrapment of carbon from the vehicle in the fused enamel during firing. It also eliminates running or flow of the paint during the early part of the firing operation.

The phosphorated tall oil may be present, if desired, in the composition as a dispersion control agent whereby to aid in controlling the application thickness of the glass color composition to an object. Although phosphorated tall oil is not an essential ingredient, it may be used in an amount between 0.01% and 1.5% based on the weight of the vehicle.

Glass colors for admixture with vehicles to print or squeegee through screen stencils are well known in the art. Such glass colors generally consist of 5% to 20% of inorganic oxide pigments and correspondingly 95% to 80% of finely divided glass particles. Usually lead-borosilicate glass is employed as the glass particle ingredient of the glass colors.

The improved glass color vehicle of this invention has particular utility in the rapid application of glass colors to objects prior to firing thereof. The vehicle has the advantage of application of glass colors in thin, uniform layers which may be fired without running together of the colors. The glass color compositions containing the vehicle of this invention may be shipped as solid pellets or particles which, when melted, have a consistent viscosity and adherence to the objects to be decorated.

The following examples are given to illustrate in detail several preferred glass color vehicles of this invention. It is to be understood that the specific details given in the examples are not to be considered as limiting the scope of the invention.

Example I

| | Parts |
|---|---|
| "Staybelite" resin (hydrogenated rosin) | 27.1 |
| "Poly-pale" resin | 20.1 |
| Stearic acid | 47.3 |
| Ethyl cellulose | 0.5 |

Heat and stir the above constituents together at 120–130° C. until homogeneous. Then add:

| | |
|---|---|
| Commercial stearyl acid phosphate | 5.0 |
| Total | 100.0 |

Stir at the above temperature until homogeneous. The mass is then cooled to room temperature. The above-said mass constitutes a vehicle which may be mixed, at a temperature between 47° C. and 100° C. with a glass color in the proportion of one part of said mass to three to five parts glass color to produce a composition which may be squeegeed through a screen stencil at a temperature between 47° C. and 100° C. and will solidify at room temperature.

Example II

| | Parts |
|---|---|
| "Staybelite" resin (hydrogenated rosin) | 26.9 |
| "Poly-pale" resin | 19.9 |
| Stearic acid | 46.7 |
| Ethyl cellulose | 0.5 |

Heat and stir the above constituents at 120–130° C. until homogeneous. Then add:

| | |
|---|---|
| Commercial stearyl acid phosphate | 5.0 |
| Phosphorated tall oil | 1.0 |
| Total | 100.0 |

Heat at the above temperature until homogeneous. The mass after becoming homogeneous was allowed to cool and constituted a vehicle for a glass color in the same manner as stated in Example I.

The vehicles described above have a melting point well above room temperature and may be used in the molten condition at a temperature between 45° C. and 90° C. A glass color composed of about 10% inorganic pigment and 90% glass frit may be mixed in proportion of 1:1 to 6:1 of the glass color to the vehicle and the resulting glass color composition applied to an object to be decorated through a screen stencil by means of a squeegee process. In all cases, the glass color composition almost immediately after application solidifies on the surface of the object to give a hard, tack-free coating which may be fired on the object to fuse the glass color and thereby produce a firmly bonded glass color design on the object. If desired, a plurality of glass colors in any desired registry may be superimposed on each other before carrying out the firing operation.

Reference in the specification and claims to parts, proportions, and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

I claim:

1. A vehicle for glass colors comprising 30% to 60% of stearic acid, 15% to 40% of hydrogenated rosin, 10% to 30% "poly-pale" resin, 0.1% to 10% ethyl cellulose, and 2% to 7% of a stearyl acid phosphate.

2. A glass color composition comprising a mixture of a glass color and a vehicle in the proportion of 1:6 parts glass colors to one part of vehicle, said vehicle comprising 30% to 60% of stearic acid, 15% to 40% of hydrogenated rosin, 10% to 30% of "poly-pale" resin, 0.1% to 10% ethyl cellulose, and 2% to 7% of a stearyl acid phosphate.

CHRISTIAN C. JESSEN.

REFERENCES CITED

The following references are of record in the file of this patent:

UNITED STATES PATENTS

| Number | Name | Date |
|---|---|---|
| 2,379,507 | Deyrup | July 3, 1945 |